(12) United States Patent
Srivastava et al.

(10) Patent No.: US 7,555,597 B2
(45) Date of Patent: Jun. 30, 2009

(54) DIRECT CACHE ACCESS IN MULTIPLE CORE PROCESSORS

(75) Inventors: Durgesh Srivastava, Santa Clara, CA (US); Jeffrey D. Gilbert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 11/518,480

(22) Filed: Sep. 8, 2006

(65) Prior Publication Data

US 2008/0065832 A1 Mar. 13, 2008

(51) Int. Cl.
G06F 12/00 (2006.01)
(52) U.S. Cl. ............... 711/113; 711/130; 711/145; 711/146; 711/147; 711/154; 370/389
(58) Field of Classification Search ............... 711/113, 711/130, 145, 146, 147, 154; 370/389
See application file for complete search history.

(56) References Cited

U.S. PATENT DOCUMENTS

| 6,075,938 | A  | * | 6/2000  | Bugnion et al. | 703/27 |
| 6,163,834 | A  | * | 12/2000 | Garcia et al. | 711/206 |
| 6,725,289 | B1 | * | 4/2004  | Waldspurger et al. | 710/9 |
| 7,159,077 | B2 | * | 1/2007  | Tu et al. | 711/124 |
| 2005/0132102 | A1 |   | 6/2005 | Huggahalli et al. | |
| 2006/0004961 | A1 | * | 1/2006 | Tu et al. | 711/119 |
| 2006/0004965 | A1 | * | 1/2006 | Tu et al. | 711/137 |
| 2006/0085602 | A1 |   | 4/2006 | Huggahalli et al. | |
| 2006/0136671 | A1 |   | 6/2006 | Balakrishnan et al. | |
| 2006/0262782 | A1 | * | 11/2006 | Biran et al. | 370/389 |
| 2007/0156968 | A1 | * | 7/2007 | Madukkarumukumana et al. | 711/138 |
| 2007/0186279 | A1 | * | 8/2007 | Zimmer et al. | 726/9 |

OTHER PUBLICATIONS

Intel Corporation, "Server Network I/O Acceleration", White Paper, pp. 1-6, 2004.*
Huggahalli, Ram , et al., "Direct Cache Access For High Bandwith Network I/O", *IEEE*, (2005), 10 pgs.
Madukkarumukumana, Rajesh , et al., "Performing Direct Cache Access Transactions Based on a Memory Access Data Structure", P22018—U.S. Appl. No. 11/323,262, filed Dec. 30, 2005 *(non-published Intel Application)*.

* cited by examiner

*Primary Examiner*—Stephen C Elmore
(74) *Attorney, Agent, or Firm*—Caven & Aghevli LLC

(57) ABSTRACT

Methods and apparatus to perform direct cache access in multiple core processors are described. In an embodiment, data corresponding to a direct cache access request is stored in a storage unit and a corresponding read request is generated. Other embodiments are also described.

30 Claims, 5 Drawing Sheets

DIRECT CACHE ACCESS IN MULTIPLE CORE PROCESSORS

BACKGROUND

The present disclosure generally relates to the field of electronics. More particularly, an embodiment of the invention relates to techniques to improve input/output (I/O) performance in multiple core processors.

How I/O data is made available to a processor may be a key factor in data processing performance. For example, some I/O adapters may take advantage of direct memory access (DMA) techniques to write I/O data into system memory concurrent to processor execution. Hence, DMA mechanisms may decouple processors from the burden of moving data from an I/O source into system memory. However, in situations where a processor needs to manipulate I/O data, processor to memory accesses may still become a significant source of inefficiency.

Moreover, some processors may include a private level 1 (L1) cache that may cache data locally for faster access. For example, direct cache access (DCA) may be used to transfer data from an I/O device into a processor's L1 cache. Accordingly, DCA may be used to reduce system memory access latency. However, placing I/O data into a processor's L1 cache may consume valuable space in the processor's L1 cache.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Figure 1:
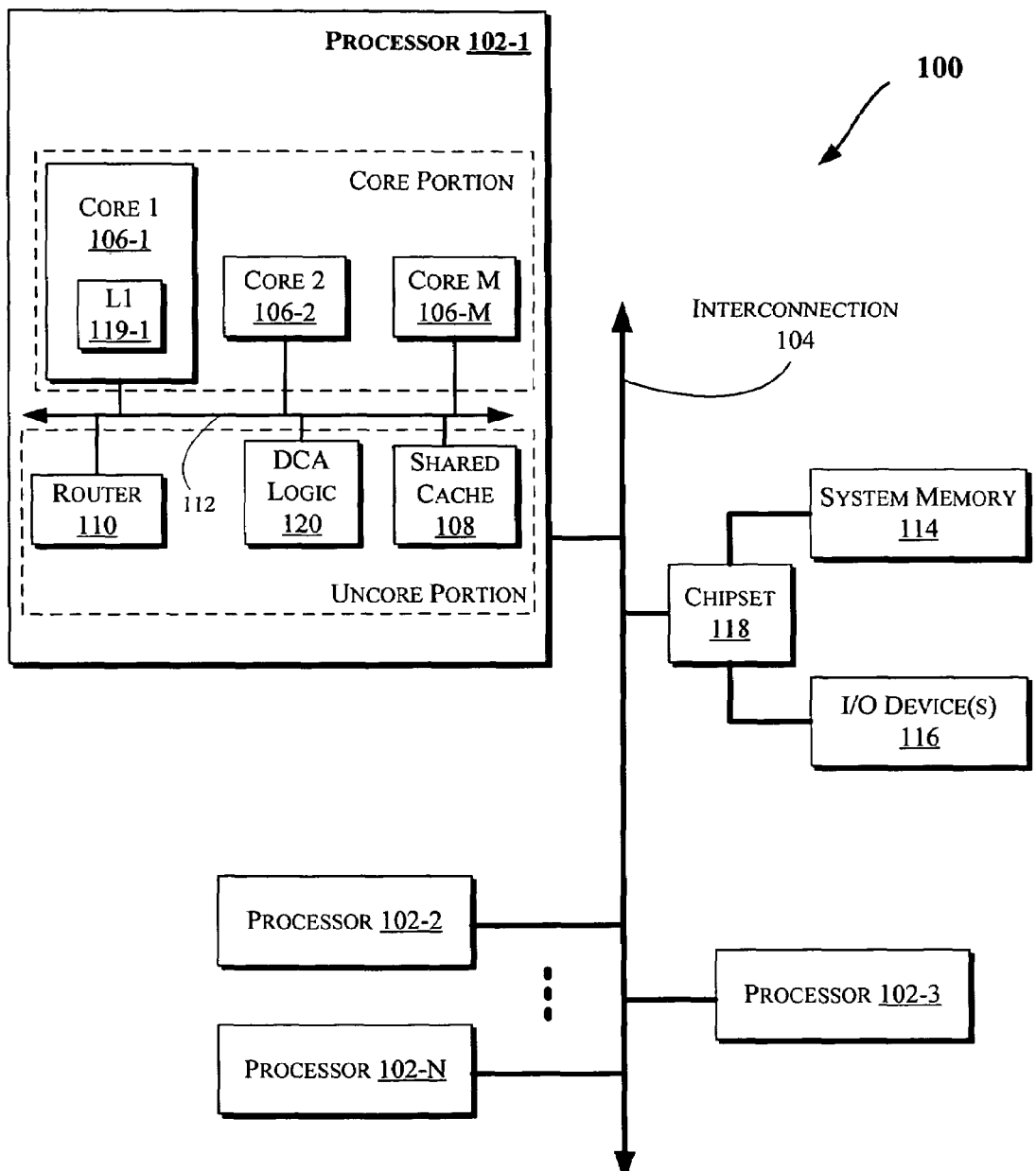
FIGS. 1, 4, and 5 illustrate block diagrams of embodiments of computing systems, which may be utilized to implement various embodiments discussed herein.

Some of the embodiments discussed herein may utilize a DCA logic to transfer data into a shared cache. The DCA logic may be provided in an uncore portion of a processor with multiple cores. In an embodiment, the DCA logic may enable the transfer of I/O data into the shared cache before, instead of, or in parallel with placing the data into system memory, or by placing the data into system memory or an intermediate cache and using a hint to trigger the placement of the data into the shared cache. Moreover, in some embodiments, I/O data may be transferred into a cache that is shared amongst various cores of a computing system with multiple cores, such as the computing systems discussed with reference to FIGS. 1 and 4-5. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 4 and 5), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a system memory 114 for faster access by components of the processor 102. Also, as will be further discussed herein, the cache 108 may store I/O data from one or more I/O devices 116. As shown in FIG. 1, the memory 114 and/or the I/O device(s) 116 may be in communication with the processors 102 via a chipset 118. In an embodiment, the cache 108 may include a mid-level cache (such as a level 2 (L2), a level 3 (L3), a level 4 (L4), or other levels of cache), a last level cache (LLC), and/or combinations thereof.

In some embodiments, one or more of the cores 106 may include a level 1 (L1) cache (119-1) (generally referred to herein as "L1 cache 119"). Various components of the processor 102-1 may communicate with the shared cache 108 directly, through a bus (e.g., the bus 112), and/or a memory controller or hub. In an embodiment, a DCA logic 120 may cause transfer of data from various components of the system 100 (e.g., including I/O device(s) 116) to the shared cache 108 before, instead of, or in parallel with placing the data into the system memory 114, or by placing the data into system memory 114 or an intermediate cache and using a hint to trigger the placement of the data into the shared cache 108.

Also, as illustrated in FIG. 1, the processor portion may include a core portion with the cores 106 and an uncore portion that may include one or more of the DCA logic 120, the shared cache 108, or the router 110. Including the DCA logic 120 in the uncore portion may allow other processor core designs to be used with the same or similar DCA logic 120 design. Also, design modifications to the cores 106 may be performed independent and/or in parallel with modifications to the DCA logic 120. Such embodiments may allow for a more precise control over the DCA operations and/or storage of I/O data in a relatively larger shared cache 108 rather than a core-specific cache, e.g., with potential size constraints (such as the L1 cache 109). Furthermore, some embodiments may reduce memory latency and/or increase memory bandwidth to allow computer systems to efficiently engage in certain types of processing otherwise infeasible such as, for example, TCP/IP (transmission control protocol/Internet protocol) processing that achieves 10 Gb/s network I/O transfer rates, or I/O transfer rates that are higher (or lower).

Figure 2:
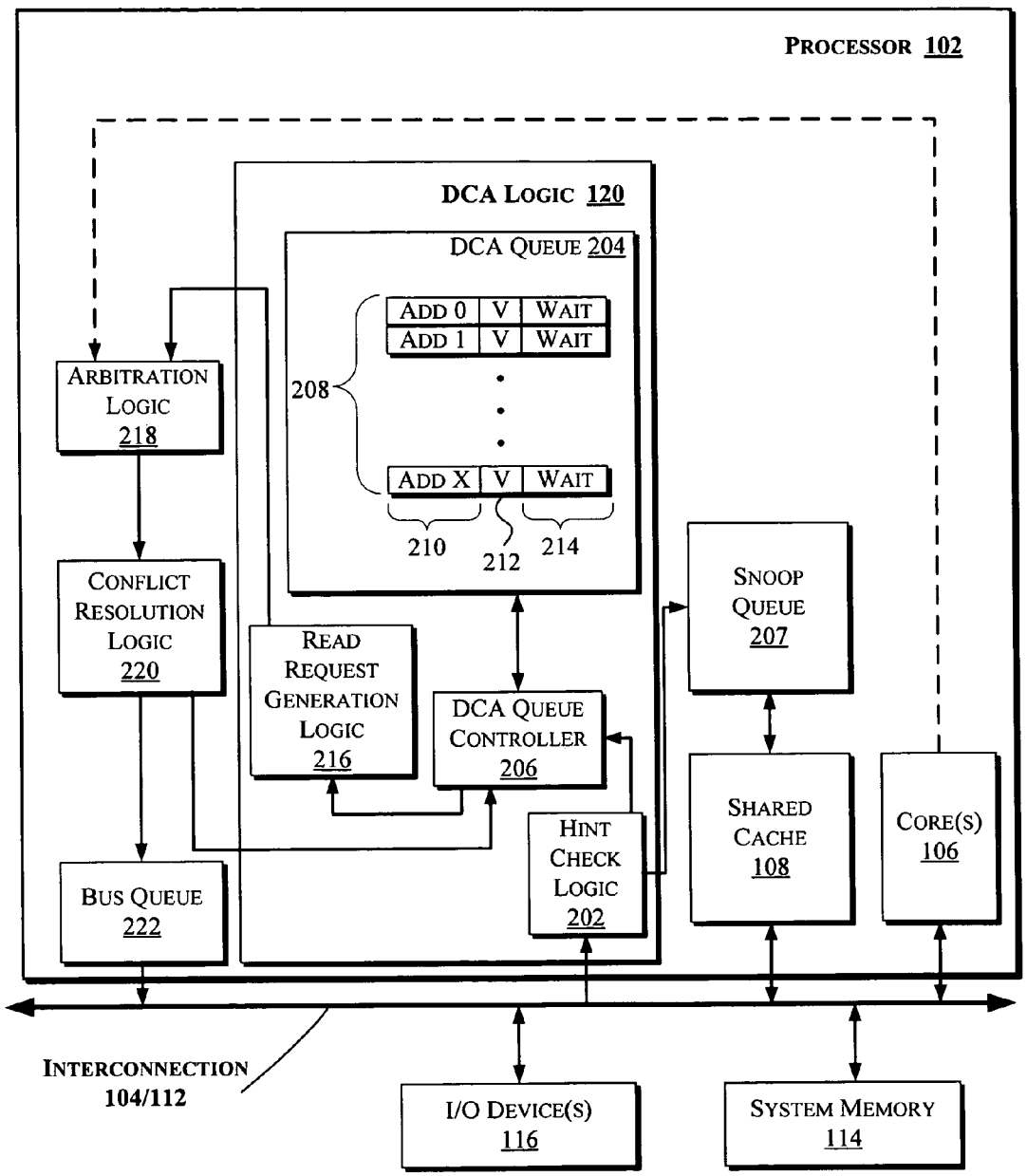
FIG. 2 illustrates a block diagram of portions of a direct cache access (DCA) logic and other components of a computing system, according to an embodiment of the invention.

FIG. 2 illustrates a block diagram of portions of a DCA logic 120 and other components of a computing system, according to an embodiment of the invention. Various operations of the components of FIG. 2 will be further discussed with reference to FIG. 3. As shown in FIG. 2, the DCA logic 120 may include a hint check logic 202 to determine whether an incoming request includes a DCA hint. The logic 202 may transmit the requests that include a DCA hint to a DCA queue 204 through a DCA queue controller 206. The size of the DCA queue 204 may be configurable, for example, through software (e.g., at system startup) or dynamically, for example, by utilizing a portion of/the shared cache 108 to implement all or a portion of the queue 204. In embodiments that utilize a DCA hint embedded with a snoop request, the logic 202 may also forward the received snoop request to a snoop queue 207 (at the same time, before, or after forwarding the request to the DCA queue 204). Moreover, in some embodiments, the I/O device(s) 116 may write data to a memory buffer (e.g., within the system memory 114). As part of the write operation (e.g., because the memory buffer may be in coherent memory) the I/O device(s) 116 may also issue a request for ownership (RFO) transaction (which may be referred to as an invalidating snoop) and the DCA hint may be provided with such a snoop transaction. Furthermore, the snoop queue 207 may enable inter-agent coherence operations, e.g., by coordinating sharing of cache lines. For example, the entries in the snoop queue 207 may cause a snoop probe into the shared cache 108 and/or cores 106. Also the snoop queue 207 may receive snoop responses from the cores 106 and update the corresponding snoop queue entries.

As illustrated in FIG. 2, the DCA queue 204 may include one or more entries 208. Each entry may include an address field 210 (e.g., including a physical memory address corresponding to the DCA request received by the logic 202), a validity field 212 (e.g., that may be a single bit in an embodiment to indicate whether the corresponding entry includes a valid entry), and/or a wait field 214 (e.g., which may used to determine how long a corresponding read request is to wait for dispatch). In an embodiment, the wait field 214 may be implemented as a counter that counts up or down to a predetermined value to indicate a predetermined time period over which a given entry 208 is to wait prior to dispatch.

In an embodiment, the queue 204 may be implemented as a first-in, first-out (FIFO). Also, the queue 204 may be implemented as a circular buffer with a read pointer and a write pointer. The controller 206 may maintain the read and write pointers of the queue 204. A logic 216 may generate a corresponding read request once an entry in the queue 204 is ready for dispatch, for example, once the wait 214 indicates that the corresponding entry at the head of the queue 204 is ready for dispatch. An arbitration logic 218 may arbitrate between inputs from core(s) 106, the logic 216, and/or other components of the processor 102 to determine which entry is to be transmitted over the bus 104 next.

Furthermore, a logic 220 may determine whether any conflicts exist between the output of the arbitration logic 218 and other entries of a bus queue 222. In each case, the logic 220 may generate and transmit a corresponding signal to the controller 206 to indicate whether the generated read request (e.g., by the logic 216) is accepted or declined. In response to the signal from logic 220, the controller 206 may update the value of the read pointer of the queue 204. Additionally, the logic 220 may forward the output of the logic 218 to the bus queue 222 for dispatch over the interconnections 104 and/or 112, e.g., to obtain corresponding data from memory 114 for storage in the shared cache 108.

As illustrated in FIG. 2, the system memory 114 (e.g., including a controller, which in an embodiment may be provided in the processor 102) and/or I/O device(s) 116 (e.g., through a I/O bus interface) may communicate via the interconnections 104 and/or 112, e.g., rather than through the chipset 118 discussed with reference to FIG. 1. Also, more generally, one or more of the components discussed with reference to FIGS. 1-2 may communicate directly or through other types of communication channels in addition to or instead of the interconnections 104/112. Further operations of the components of FIGS. 1-2 will now be discussed by reference to FIG. 3.

Figure 3:
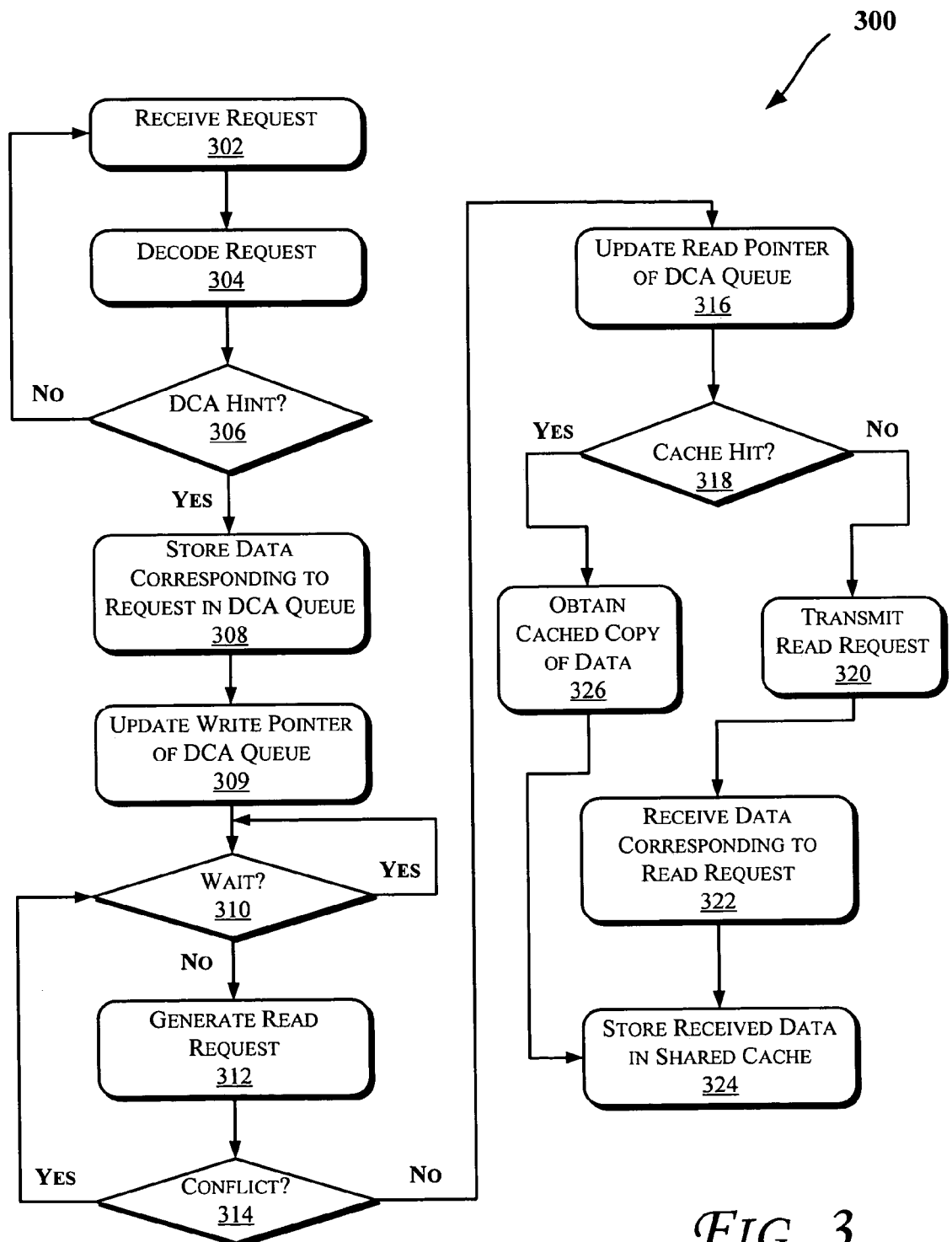
FIG. 3 illustrates a flow diagram of a method to transfer data to a shared cache, according to an embodiment.

FIG. 3 illustrates a flow diagram of a method 300 to transfer data to a shared cache, according to an embodiment. In one embodiment, various components discussed with reference to FIGS. 1-2, 4, and 5 may be utilized to perform one or more of the operations discussed with reference to FIG. 3. For example, the method 300 may be used to transfer I/O data from the I/O device(s) 116 to the shared cache 108.

Referring to FIGS. 1-3, at an operation 302, a request (such as a snoop request) may be received by the logic 202, e.g., from the I/O device(s) 116. For example, logic within the I/O device(s) 11.6 (such as a direct memory access (DMA) logic) may generate and/or transmit a memory request at the operation 302. At an operation 304, the logic 202 may decode the request to determine whether a DCA hint is embedded with the received request (306). The hint may include one or more bits of data. Also the request may include one or more attributes of the DCA. For example, the request may indicate the specific cache (or cache level) that is to store data returned in response to transmission of the corresponding read request (at operation 320) and/or the latency or wait period associated with dispatching a corresponding read request (at operations 310 and 312, for example). If a DCA hint is absent at operation 306, the method 300 resumes at operation 302.

At an operation 308 after the presence of the DCA hint is confirmed, data corresponding to the received request may be stored in the DCA queue 204 such as discussed with reference to FIG. 2. At an operation 309, the controller 206 may update the write point of the DCA queue 204, e.g., to indicate that an entry has been added to the queue 204. In some embodiments, the controller 206 may first determine whether the queue 204 has available space prior to performing the operation 308. If the queue 204 is full, the corresponding data at operation 308 may be dropped (or buffered until an entry becomes available) and operation 309 may be skipped. Alternatively, the new entry may overwrite one of the entries of the queue 204. For example, the new entry may overwrite the oldest entry at the head of the queue 204, the youngest entry at the tail of the queue 204, or another entry based on some criterion (such as a predetermined I/O type priority attribute, source device priority, etc. that may be stored in a corresponding field of the entry in the queue 204). These approaches may allow DCA to be configured (e.g., through software) based on the application being executed on the processor 102 and optimize the performance accordingly.

At an operation 310, the value stored in the corresponding field 214 may be utilized to wait for a predetermined time period prior to continuing with method 300 at operation 312. At operation 312, the logic 216 may generate a read request that corresponds to an entry of the queue 204 that is to be dispatched next, e.g., an entry that is at the head of the queue 204. At operation 314, if the logic 220 determines the existence of a conflict, the method 300 may resume with the operations 310. Alternatively, if the logic 220 determines the existence of a conflict at operation 314, the method 300 may simply drop the particular read request of operation 312 and update the read pointer of the DCA queue. After operation 314 indicates no conflicts exist, at an operation 316, the controller 206 may update the read pointer of the DCA queue 204, e.g., in response to a signal generated by the logic 220 such as discussed with reference to FIG. 2.

At an operation 318, the bus queue 222 may cause a cache lookup to determine whether the read request transmitted through the logic 220 corresponds to a current cache entry (e.g., in caches 108 and/or 119). If a cache miss occurs at operation 318, the bus queue 222 may transmit the read request over the interconnections 104/112 to the buffer for the corresponding I/O device(s) 116 in system memory 114 at operation 320. At an operation 322, the data corresponding to the read request may be received from the system memory 114. For example, system memory 114 may receive the read request of operation 320 and in response transmit the corresponding data from buffer for the I/O device(s) for storage in the shared cache 108 at operation 324.

At operation 318, if the corresponding data is present in the cache (e.g., cache 108 and/or 119), at an optional operation 326, the cached data may be obtained for storage in the shared cache 108 at operation 324. At operation 326, the generated read request of operation 312 may be dropped by the bus queue 222. In an embodiment, operations 326 and 324 may cause copying of data corresponding to the read request of operation 312 from the L1 cache 119 into the shared cache 108. If the data is already present in cache 108, operations 324 and 326 may be skipped.

Figure 4:
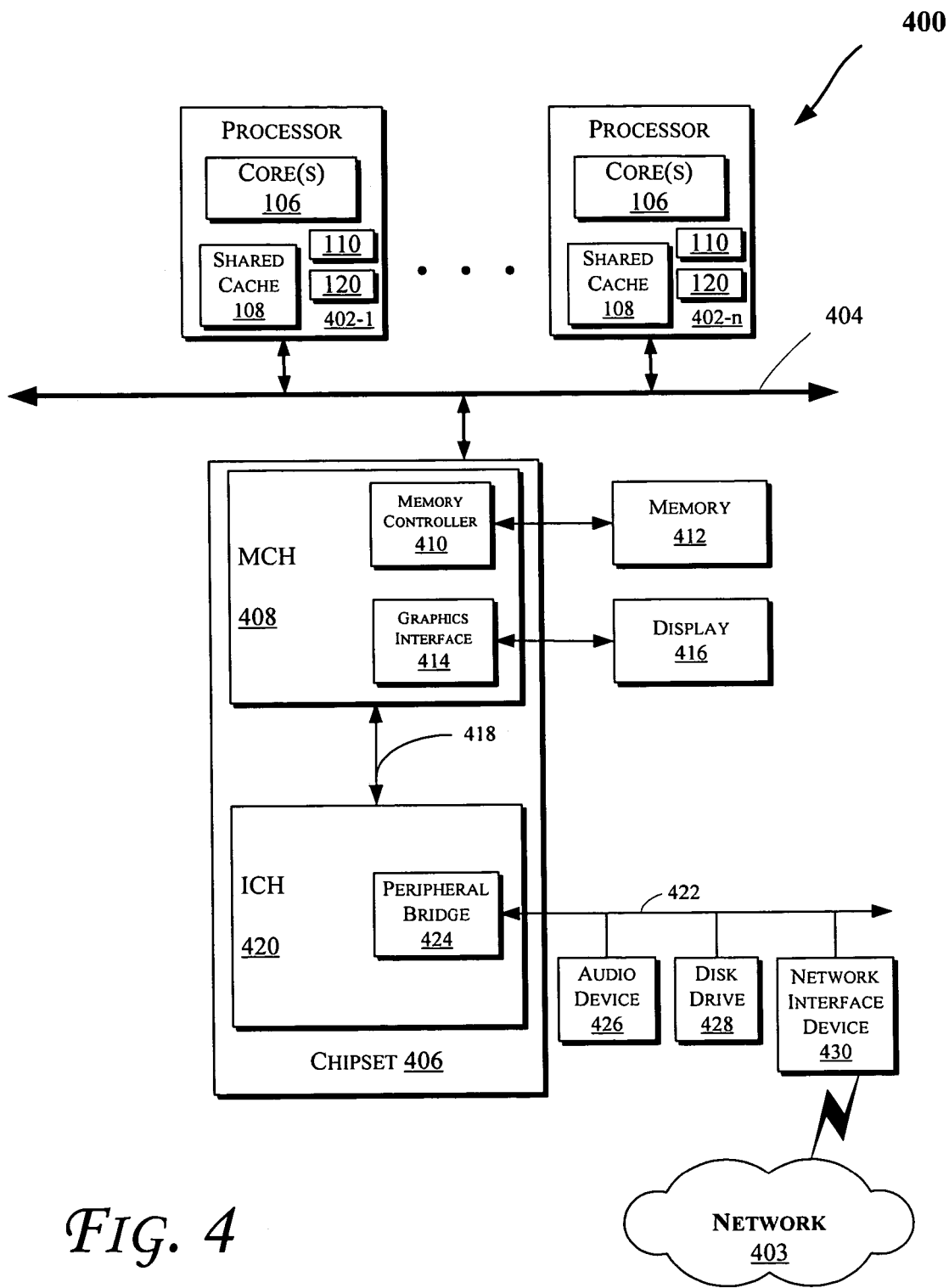

FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. For example, one or more of the processors 402 may include one or more of the cores 106, the router 110, the DCA logic 120, and/or shared cache 108. Also, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412 (which may be the same or similar to the memory 114 of FIG. 1). The memory 412 may store data, including sequences of instructions, that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display device 416. In one embodiment of the invention, the graphics interface 414 may communicate with the display device 416 via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O device(s) (e.g., such as device(s) 116) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430 and/or the I/O device(s) 116) may communicate with the MCH 408 via a high speed (e.g., general purpose) I/O bus channel in some embodiments of the invention. In addition, the processor 402 and the MCH 408 may be combined to form a single chip. Furthermore, a graphics accelerator may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
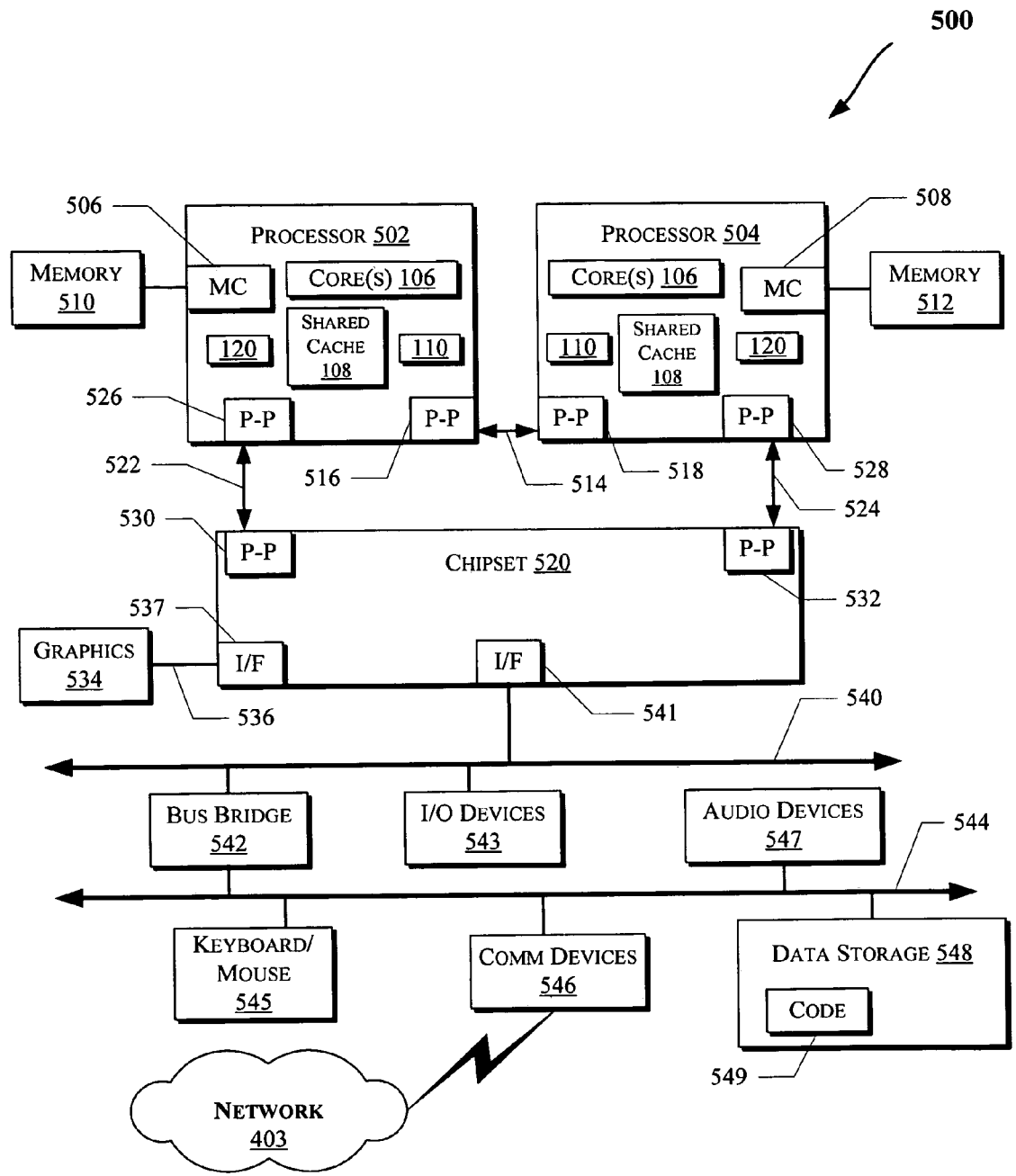

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller (MC) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Further, the processors 502 and 504 may include a high speed (e.g., general purpose) I/O bus channel in some embodiments of the invention to facilitate communication with various components (such as the I/O device(s) 116). Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment of the invention may be provided within the processors 502 and 504. For example, one or more of the router 110, DCA logic 120, and/or shared cache 108 of FIG. 1 may be located within the processors 502 and 504. Other embodiments of the invention, however, may exist in other circuits, logic units, or devices within the system 500 of FIG. 5. Furthermore, other embodiments of the invention may be distributed, throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), firmware, or combinations thereof.

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
   a first logic to cause storage of data corresponding to one or more direct cache access requests in a storage unit in response to detection of a direct cache access hint; and
   a second logic to generate a read request corresponding to one of the direct access requests,
   wherein the second logic is to generate the read request after a predetermined time period.

2. The processor of claim 1, further comprising a third logic to determine whether one or more incoming memory requests correspond to the one or more direct cache access requests.

3. The processor of claim 2, wherein the incoming memory requests that correspond to the direct cache access requests comprise a direct cache access hint.

4. The processor of claim 1, wherein the direct cache access requests correspond to snoop requests.

5. The processor of claim 1, wherein each entry of the storage unit comprises one or more of an address field, a validity field, or a wait field.

6. The processor of claim 5, wherein the predetermined time period corresponds to a value stored in the corresponding wait field of an entry of the storage unit.

7. The processor of claim 1, further comprising a third logic to transmit the read request to a system memory.

8. The processor of claim 1, further comprising a shared cache to store data transmitted in response to the read request.

9. The processor of claim 8, wherein the shared cache comprises one or more of a mid-level cache, a last level cache, or combinations thereof.

10. The processor of claim 1, further comprising a core portion and an uncore portion.

11. The processor of claim 10, wherein the uncore portion comprises the first and second logics.

12. The processor of claim 10, wherein the core portion comprises a plurality of processor cores.

13. The processor of claim 1, wherein one or more of the first logic, the second logic, a plurality of processor cores, or a shared cache are on a same integrated circuit die.

14. A method comprising:
   storing data corresponding to a memory request in a direct cache access queue after determining that the memory request comprises a direct cache access hint; and
   generating a read request corresponding to the memory request after a predetermined time period.

15. The method of claim 14, further comprising accessing a wait field of an entry of the direct cache access queue that corresponds to the memory request to determine the predetermined time period.

16. The method of claim 14, further comprising decoding a snoop request to determine whether the snoop request corresponds to the memory request.

17. The method of claim 14, wherein storing the data comprises storing one or more of an address field, a validity field, or a wait field corresponding to the memory request in the direct cache access queue.

18. The method of claim 14, further comprising transmitting the read request to a system memory.

19. The method of claim 14, further comprising storing data transmitted in response to the read request in a shared cache.

20. The method of claim 14, further comprising:
updating a write pointer of the direct cache access queue after storing the data in the direct cache access queue; and
updating a read pointer of the direct cache access queue after generating the read request.

21. A computing system comprising:
an input/output (I/O) device to cause transmission of a snoop request; and
at least one processor comprising:
a direct cache access queue to store a plurality of bits representing a direct cache access request corresponding to the snoop request; and
a hint check logic to decode the snoop request and cause storage of the plurality of bits in the direct cache access queue in response to a direct cache access hint embedded with the snoop request.

22. The system of claim 21, further comprising a read request generation logic to generate a read request corresponding to the direct cache access request.

23. The system of claim 21, further comprising a shared cache to store data returned in response to the read request.

24. The system of claim 21, wherein the at least one processor comprises a plurality of processor cores.

25. The system of claim 21, wherein the I/O device comprises one or more of a network interface device, a disk drive, or an audio device.

26. An apparatus comprising:
a first logic to detect whether a memory access request corresponds to a direct cache access request and to cause data corresponding to the direct cache access request to be stored in a storage unit; and
a second logic to generate a read request corresponding to the direct access requests, the second logic to generate the read request in response to an expiration of a time period corresponding to the direct cache access request.

27. The apparatus of claim 26, wherein the direct cache access request corresponds to a snoop request.

28. The apparatus of claim 26, further comprising a shared cache to store data transmitted in response to the read request.

29. The apparatus of claim 26, wherein the memory access request that corresponds to the direct cache access request comprises a direct cache access hint.

30. The apparatus of claim 26, wherein one or more of the first logic, the second logic, a plurality of processor cores, or a shared cache are on a same integrated circuit die.

* * * * *